(No Model.)
W. J. FAUL.
LUBRICATOR.
No. 419,429. Patented Jan. 14, 1890.
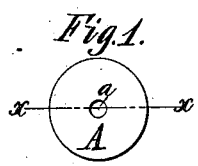
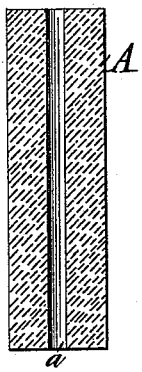
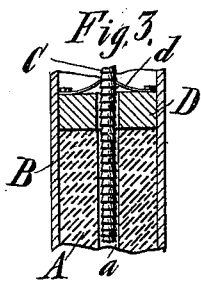
Witnesses
John Bicket
O. Lundgren
Inventor;
William J. Faul
By his Attorneys
Brown & Griswold

UNITED STATES PATENT OFFICE.

WILLIAM J. FAUL, OF BROOKLYN, NEW YORK.

LUBRICATOR.

SPECIFICATION forming part of Letters Patent No. 419,429, dated January 14, 1890.

Application filed June 20, 1889. Serial No. 315,005. (No model.)

*To all whom it may concern:*

Be it known that I, WILLIAM J. FAUL, of Brooklyn, in the county of Kings and State of New York, have invented a certain new and useful Improvement in Lubricants, of which the following is a specification.

My improvement relates to so-called "stick" lubricants, or, in other words, lubricants consisting of a stick of hard grease, which is fed forward by suitable means onto a shaft or axle.

In the accompanying drawings, Figure 1 is an end view of a stick of lubricant embodying my improvement. Fig. 2 is a longitudinal section of the same, taken on the line $x\ x$, Fig. 1. Fig. 3 is a detail view showing the manner in which said lubricant is to be employed.

Similar letters of reference designate corresponding parts in all the figures.

A designates a stick of lubricant, which may be of any suitable substantially-hard lubricating material. Such stick of lubricant is tubular, or, in other words, is provided centrally and throughout its length with a passage-way $a$.

Stick lubricants are usually inclosed in a metallic shell or case secured to a hub, and the grease is fed forward into constant contact with a shaft or axle by means of a weight. In Fig. 3 I have illustrated the manner in which a tubular lubricant embodying my improvement is to be employed.

B designates a shell, and C a ratchet formed upon a rod. The rod extends through the passage $a$ in the stick of lubricant.

D designates a weight. Upon this weight are arranged pawls $d$, which engage the ratchet C. As the lubricant is worn away by the rotation of the shaft or axle the weight will move inwardly and the pawls $d$ will successively engage the ratchet, so as to maintain the stick of grease always in contact with the shaft or axle. The outer end of the rod upon which the ratchet C is formed may be secured to a cap upon the shell B, which cap is not shown.

What I claim as my invention, and desire to secure by Letters Patent, is—

A stick of substantially-hard lubricant provided centrally and throughout its length with a passage-way, substantially as specified.

WILLIAM J. FAUL.

Witnesses:
 FREDK. HAYNES,
 GEO. BARRY.